US008182209B2

(12) United States Patent
Brault et al.

(10) Patent No.: US 8,182,209 B2

(45) Date of Patent: May 22, 2012

(54) AIR REINJECTION COMPRESSOR

(75) Inventors: Michel Gilbert Roland Brault, Quincy Sous Senart (FR); Thierry Jean-Jacques Obrecht, Melun (FR)

(73) Assignee: SNECMA, Paris (FR)

(*) Notice: Subject to any disclaimer, the term of this patent is extended or adjusted under 35 U.S.C. 154(b) by 1028 days.

(21) Appl. No.: 12/128,988

(22) Filed: May 29, 2008

(65) Prior Publication Data

US 2008/0298951 A1 Dec. 4, 2008

(30) Foreign Application Priority Data

May 30, 2007 (FR) ..................................... 07 55323

(51) Int. Cl.
*F04D 29/68* (2006.01)

(52) U.S. Cl. ........ 415/144; 415/58.7; 415/160; 415/914

(58) Field of Classification Search ................. 415/54.1, 415/58.4, 58.5, 58.7, 144, 151, 160, 191, 415/209.3, 211.2
See application file for complete search history.

(56) References Cited

U.S. PATENT DOCUMENTS

| | | | | |
|---|---|---|---|---|
| 3,123,283 | A | 3/1964 | Leis | |
| 2004/0081552 | A1 | 4/2004 | Guemmer | |
| 2006/0104805 | A1* | 5/2006 | Gummer | 415/58.5 |

FOREIGN PATENT DOCUMENTS

| | | | |
|---|---|---|---|
| EP | 1 482 129 | A2 | 12/2004 |
| GB | 2 027 811 | A | 2/1980 |
| WO | WO 80/00728 | | 4/1980 |

* cited by examiner

*Primary Examiner* — Edward Look
*Assistant Examiner* — Dwayne J White
(74) *Attorney, Agent, or Firm* — Oblon, Spivak, McClelland, Maier & Neustadt, L.L.P.

(57) ABSTRACT

Reinjecting air to the inlet of a compressor in order to improve its pumping margin. The inlet stator of the compressor includes injection holes passing through at least some of the vanes in the vicinity of their pivots.

6 Claims, 2 Drawing Sheets

AIR REINJECTION COMPRESSOR

The invention relates to a compressor, in particular a high pressure compressor for a turbomachine such as an airplane turbojet. The invention relates more particularly to reinjecting air to the inlet in order to improve the operability (or pumping margin) of such a compressor.

BACKGROUND OF THE INVENTION

In a high pressure compressor comprising an annular casing having installed therein a plurality of stages of bladed rotor wheels, it is known that the first rotor wheel is particularly sensitive in terms of operability. It is known to take air under pressure from one of the stages of the compressor itself and to reinject it upstream from the first rotor wheel, and in the vicinity thereof. Conventionally, air is reinjected through holes or tubes that pass through the outer shroud of the casing. The air flow is guided to be as tangential as possible relative to the wall of the casing.

OBJECTS AND SUMMARY OF THE INVENTION

The invention relates to an improvement of that type of compressor for improving the efficiency with which air is reinjected regardless of engine speed. The idea on which the invention is based consists in causing the orientation with which air is reinjected to vary as a function of engine speed. This is achieved by taking advantage of the fact that the vanes of the inlet stator, upstream from the first compression stage, present pitch that is adjustable as a function of engine speed. The invention thus consists in associating air reinjection with the adjustable pitch of the vanes of the stator in order to improve the effectiveness of the reinjection.

For this purpose, the invention relates mainly to a compressor comprising a casing housing a plurality of compression stages, each comprising a bladed rotor wheel driven in rotation, the first stage being preceded by an inlet stator presenting stationary vanes of adjustable pitch, having pivots that pass through said casing, and an air reinjection circuit, wherein said air reinjection circuit includes injection holes passing through at least some of the vanes of said inlet stator, and opening out internally in the vicinity of their pivots, at the inlet of said compressor.

Conventionally, the reinjected air can be taken from one of the compression stages.

For each vane of the stator that is concerned thereby, at least one such hole is formed in inclined manner, e.g. through the circular outline base between the pivot of the vane and its airfoil, or indeed in part through the pivot itself.

The injection holes are formed in vanes of the inlet stator that are regularly spaced apart circumferentially.

The holes may be formed in all of the vanes, or only in a fraction of them, e.g. every other vane, one vane in three, etc. . . .

The holes may open out into the inlet stream of the compressor to the pressure side or to the suction side of the vanes of the inlet stator. It is preferable for at least some of the holes to open out into the suction side. Nevertheless, several holes may open out into the suction side and others into the pressure side.

To improve the efficiency with which air is reinjected, it is preferable for the holes to open out into the inlet stream of the compressor in a manner that is substantially tangential relative to the casing.

BRIEF DESCRIPTION OF THE DRAWINGS

The invention can be better understood and other advantages thereof appear more clearly in the light of the following description of a compressor in accordance with the principle of the invention, given solely by way of example and made with reference to the accompanying drawings, in which.

MORE DETAILED DESCRIPTION

Figure 2:
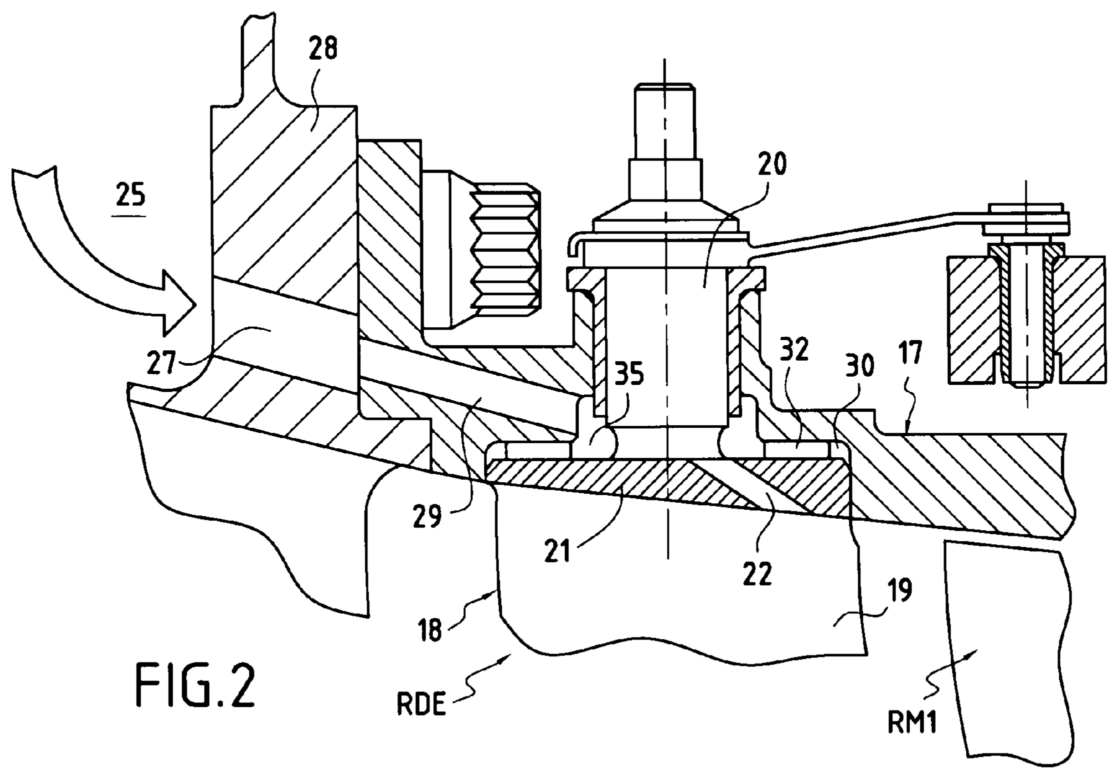
FIG. 2 is a detail view of a compressor in accordance with the invention showing how air flows through the pivots of the adjustable stationary vanes of the inlet stator.

In the drawings, there can be seen diagrammatically and in section, a high pressure compressor 11 of annular configuration about an axis X and having six compression stages $C_1$-$C_6$, each stage comprising a bladed wheel driven in rotation, referred to as a rotor wheel $RM_1$-$RM_6$, and a stator $RD_1$-$RD_6$ comprising stationary vanes, possibly of adjustable pitch. The annular casing of the compressor comprises an inner shroud 15 that is driven in rotation and to which the rotor wheels are attached, and an outer shroud 17 that is stationary. The various stators extend between the inner shroud 15 and the outer shroud 17. In addition, an inlet stator RDE has stationary vanes of adjustable pitch. As can be seen in FIG. 2, each vane 18 of the stator RDE comprises an airfoil 19, a pivot 20 passing through the outer shroud 17, and a circular outline base 21 situated between the pivot and the airfoil.

Figure 1:
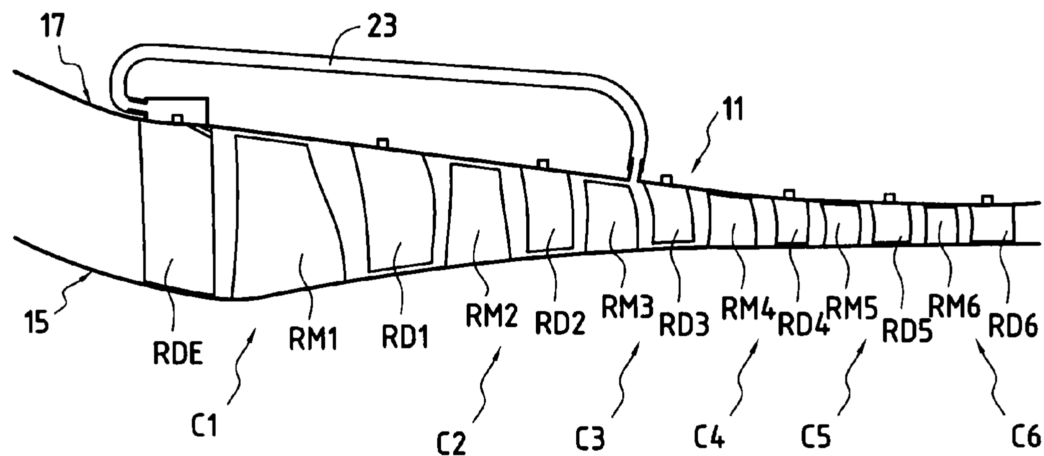
FIG. 1 is a fragmentary diagrammatic view of a high pressure compressor in which a fraction of the compressed air is reinjected to the inlet.

It is known to arrange an air reinjection circuit 23 between one of the compression stages and the inlet of the compressor. For example, as shown in FIG. 1, air is taken from the outlet of the third compression stage and reinjected upstream from the rotor wheel $RM_1$ of the first compression stage.

According to the invention, the air reinjection circuit has one or more injection holes 22 passing through at least some of the inlet stator vanes 18 that are situated immediately upstream from the rotor wheel $RM_1$ of the first stage $C_1$.

As can be seen in FIG. 2, the air taken from downstream is introduced into a manifold 25 situated outside the outer shroud of the compressor casing. Holes 27 are pierced through a flange 28 of the intermediate casing that is used for attaching the compressor to the remainder of the structure. The holes 27 are extended by holes 29 in the shroud 17, leading to the vicinity of the pivots 20 of at least some of the adjustable pitch vanes of the inlet stator RDE, situated immediately upstream from the first rotor wheel $RM_1$ of the compressor. For each vane 18, the pivot projects from the circular outline base 21 that is mounted in a corresponding housing 30 in the shroud 17. A flat annular gasket 32 is interposed between the base 21 and the bottom of the housing 30. Thus, a small annular cavity 35 remains around the base of the pivot 20. It is defined by the radially outer surface of the stator RDE, the casing shroud 17, the gasket 32, and a bushing 33 forming the bearing of the pivot 20. The corresponding hole 29 opens out into this annular cavity.

In the example, the hole(s) 22 extend between the annular cavity 35 and the inside of the casing, immediately upstream from the first rotor wheel $RM_1$ of the first compression stage $C_1$.

Figure 5A:
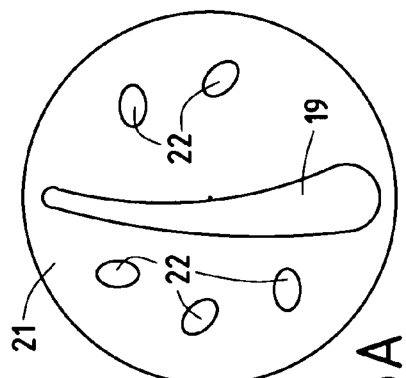
FIG. 5A is a view looking along arrow VA of FIG. 5.
Figure 5:
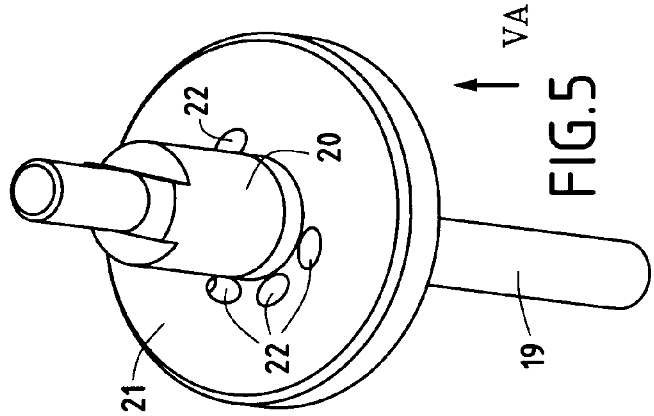
FIG. 5 is a perspective view of a stator vane in another variant of the invention.
Figure 4A:
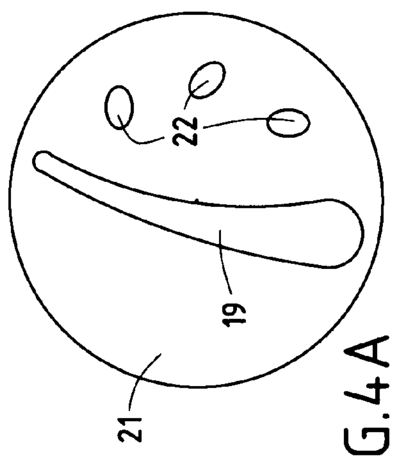
FIG. 4A is a view looking along arrow IVA of FIG. 4.
Figure 4:
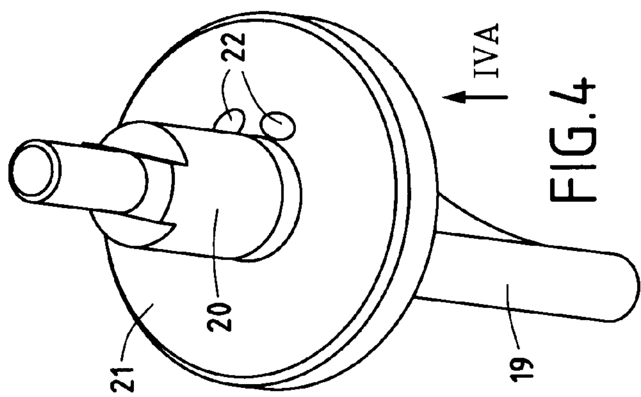
FIG. 4 is a perspective view of a stator vane in another variant of the invention.
Figure 3A:
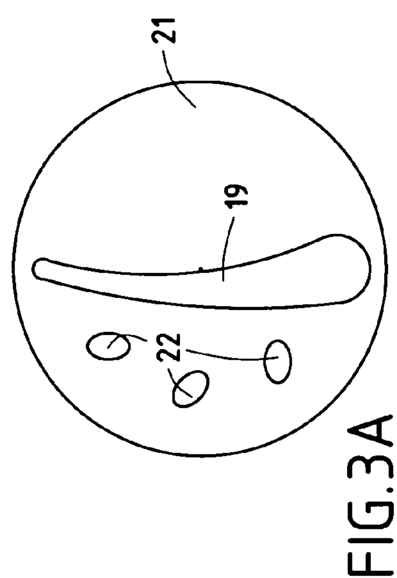
FIG. 3A is a view looking along arrow IIIA in FIG. 3.
Figure 3:
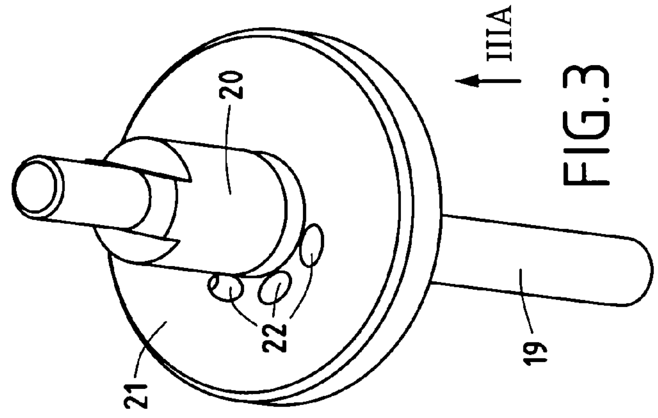
FIG. 3 is a perspective view of a stator vane in accordance with the invention.

As can be seen in the drawing, each base 21 is provided with at least one hole 22 that opens out into the inlet stream of the compressor substantially tangentially relative to the casing. As can be seen in FIGS. 3 to 5, each base 21 may be pierced by one or more oblique holes 22 for establishing this communication. By way of example, one such hole can open out into the inlet stream of the compressor on the suction side of the corresponding vane (FIGS. 3, 3A), or on the pressure side of said vane (FIGS. 4, 4A). Preferably, at least one hole is provided that opens out to the suction side, however it is possible to provide a plurality of holes, some opening out to the pressure side and others to the suction side (FIGS. 5 and 5A).

Such an arrangement may be provided for each adjustable pitch stator vane or for only some of them that are regularly spaced apart circumferentially.

Thus, causing the reinjected air to pass through the adjustable pitch vanes of the inlet stator RDE makes it possible in adjustable and favorable manner to vary the orientation of the jets of air that are reinjected into the inlet of the first compression stage, as a function of the speed of the engine. The reinjected air is guided by the adjustable positioning vane of the stator, thereby improving the efficiency of the reinjection.

Advantageously, the holes in the base 21 are calibrated and distributed so as to feed the outer stream of the compressor properly in terms of flow rate, speed, and injection angle in order to improve its performance.

When designing the holes through the base, air injection can therefore follow the various variable-setting positions of the stator and thus ensure that the rotor wheel of the compressor is fed well.

The air flow rate is calculated for each type of compressor.

What is claimed is:

1. A compressor comprising a casing housing a plurality of compression stages, each comprising a bladed rotor wheel driven in rotation, the first stage being preceded by an inlet stator presenting stationary vanes of adjustable pitch, having pivots that pass through said casing, and an air reinjection circuit, wherein said air reinjection circuit includes injection holes passing through at least some of the vanes of said inlet stator, and opening out internally in the vicinity of their pivots, into the inlet stream of the compressor substantially tangentially relative to the casing, wherein each of said stationary vane includes a base of circular outline with the pivot projecting outwards from a center thereof, wherein said base is housed in a housing in an outer shroud of the casing, wherein said injection holes extend in an inclined manner through the base, wherein holes in the outer shroud of said casing open out in an annular cavity defined around said pivot and limited by the radially external surface of the inlet stator, said outer shroud of the casing, a flat annular gasket and a bushing forming the bearing of the pivot, and wherein said injection holes extend between said annular cavity and the inside of the casing.

2. A compressor according to claim 1, wherein said injection holes are pierced in inlet stator vanes that are regularly distributed circumferentially.

3. A compressor according to claim 1, wherein said injection holes open out into the inlet stream of the compressor on the suction sides of the vanes of the inlet stator.

4. A compressor according to claim 1, wherein said injection holes open out into the inlet stream of the compressor at the pressure side of the vanes of the inlet stator.

5. A compressor according to claim 1, wherein some of the injection holes open out into the inlet stream of the compressor at the suction side and others at the pressure side of the vanes of the inlet stator.

6. A turbomachine including a compressor according to claim 1.

* * * * *